United States Patent [19]

Frey et al.

[11] 4,432,666
[45] Feb. 21, 1984

[54] PROCESS FOR THE STORAGE AND DUMPING OF WASTE MATERIALS

[75] Inventors: Rudolf Frey, Burgdorf; Peer-Ingo Litschke, Burgwedel, both of Fed. Rep. of Germany

[73] Assignee: VFI, Verwertungsgesellschaft fur Industrieruckstande mbH, Dollbergen, Fed. Rep. of Germany

[21] Appl. No.: 187,565

[22] Filed: Sep. 15, 1980

[30] Foreign Application Priority Data

Dec. 14, 1979 [DE] Fed. Rep. of Germany ....... 2950462

[51] Int. Cl.³ ................................................ B09B 3/00
[52] U.S. Cl. ..................... 405/129; 106/90; 106/900
[58] Field of Search .................. 106/90, 900; 252/629, 252/633; 405/53, 128, 129, 258, 263, 266; 166/305 D; 52/128, 133, 134, 169.6

[56] References Cited

U.S. PATENT DOCUMENTS

| | | | |
|---|---|---|---|
| 1,794,526 | 3/1931 | Lundteigen et al. | 106/90 X |
| 1,912,626 | 6/1933 | Drexler et al. | 106/90 |
| 3,179,528 | 4/1965 | Holmgren et al. | 106/90 |
| 3,215,549 | 11/1965 | Ericson et al. | 106/90 |
| 3,720,609 | 3/1973 | Smith et al. | 405/263 X |
| 3,762,937 | 10/1973 | Schupack | 106/90 |
| 3,817,767 | 6/1974 | Bozer et al. | 106/90 |
| 3,854,985 | 12/1974 | Suzuki et al. | 106/90 X |
| 3,931,083 | 1/1976 | Sasaki et al. | 106/90 X |
| 3,936,310 | 2/1976 | Natsuume | 106/90 |
| 3,947,284 | 3/1976 | Kitsugi et al. | 106/90 X |
| 3,954,491 | 5/1976 | Adrian et al. | 106/90 X |
| 3,971,717 | 7/1976 | Hild et al. | 252/629 X |
| 4,019,918 | 4/1977 | Wills, Jr. | 106/90 |
| 4,108,677 | 8/1978 | Valiga | 405/129 X |
| 4,124,405 | 11/1978 | Quiénot | 106/90 X |
| 4,131,474 | 12/1978 | Uchikawa et al. | 106/90 X |
| 4,142,912 | 3/1979 | Young | 405/129 X |
| 4,192,629 | 3/1980 | Hallenius et al. | 252/633 |
| 4,313,762 | 2/1982 | Pound | 405/129 X |
| 4,318,744 | 3/1982 | Dodson | 106/90 |

FOREIGN PATENT DOCUMENTS

| | | |
|---|---|---|
| 2322204 | 11/1973 | Fed. Rep. of Germany . |
| 2404403 | 8/1974 | Fed. Rep. of Germany . |
| 2426641 | 12/1974 | Fed. Rep. of Germany . |
| 2553617 | 8/1976 | Fed. Rep. of Germany . |
| 53-13632 | 2/1978 | Japan ................................. 106/900 |
| 5699 | of 1894 | United Kingdom ................. 52/128 |

*Primary Examiner*—George A. Suchfield
*Attorney, Agent, or Firm*—Darby & Darby

[57] ABSTRACT

A process for forming a compact, water-repellant, non-polluting mass of waste material which includes adding to the waste material a binder and forming a flowable, water-repellant mixture which is placed within a preselected site and hardened in place. A hardening agent can include waste, or polluted, water.

22 Claims, No Drawings

PROCESS FOR THE STORAGE AND DUMPING OF WASTE MATERIALS

BACKGROUND OF THE INVENTION

The invention relates to a process for the storage and dumping of waste materials having constituents which are subject to elution and emission under ambient conditions.

Various factors such as the sudden increase in the amounts of commercial and private waste, the increasing scarcity of disposal sites and the development of an environmental consciousness have, over the past few years, contributed to increasingly stricter regulations regarding waste disposal. These regulations are particularly strict in connection with so-called "special waste", formed by waste from industrial and other undertakings, which is particularly damaging to the environment. Therefore, in current waste disposal laws, additional requirements are made in connection with the disposal of waste from industrial or other undertakings, which on the basis of type, quality or quantity is particularly prejudicial to health, water or air supplies, or which is explosive or flammable or which contains carriers for communicable diseases. In general, such special waste cannot be disposed of with general refuse. The term "special waste" is used due to the particular danger caused to the environment.

Considerable problems are caused particularly by special waste which contains constituents which can be eluted and/or emitted under ambient conditions. Thus, for example, there are long term risks to the environment, due to leaching out and the collapse of drums etc., when special waste containing more than 10% water-soluble constituents is stored in above-ground dumps. Rainfall gradually elutes the special waste stored in dumps. Large quantities of salts and heavy metals are concentrated in the ground water. The toxic heavy metals have to be precipitated by costly treatment. The dissolved salts, whose removal is only made possible by very costly evaporation or ion exchange processes, generally pass in an unchanged state through the biological purification plants and increase the salt content of the affected drainage ditches and rivers.

A further problem in special waste dumps is that the deposited materials are frequently not compact. However, adequate compacting is necessary to provide an adequate strength so that vehicles can pass over the materials, and the latter must be able to take the extra load. Therefore, sludge-like or paste-like special waste must often be brought into a compact consistency, which involves considerable expenditure and for which lime, sawdust and other binders are used.

A special problem is caused by emitting special waste materials, which give off gaseous, liquid or pulverulent constituents into the environment and which therefore frequently constitute a serious hazard or at least annoyance. This applies more particularly to toxic special waste.

Special waste which reacts with water, such as magnesium waste and acid chlorides may not be stored in open special waste dumps. Thus, such special waste requires costly disposal or storage in closed containers. For safety reasons, acid and alkaline waste materials should not be stored together, because they can violently react with one another.

The purpose of this invention is to improve the process described hereinbefore so that the deposited material undergoes virtually no elution, the emission of noxious substances is prevented, even when paste and sludge like waste is removed, the stored material retains a high bearing capacity, reactions between the different waste materials and with the environment are prevented and an optimum compact storage of the waste is ensured. Particular importance is also attached to the economic aspects of the process.

According to the invention, these problems are solved when the waste materials are mixed with:
(a) a water-repelling, thermoplastic, melted binder, or
(b) a binder which hardens through chemical reaction, which is water-repelling in the reacted state, and in the presence of a hardening agent, and in the pourable or fluid state the mixture obtained is directly introduced into a dumping area where it is made to solidify or harden, or is initally placed in a mold where it is hardened or solidified and, optionally after stripping, is then introduced into a dumping area.

DETAILED DESCRIPTION OF THE PREFERRED EMBODIMENT

The process of the invention can be successfully performed with surprisingly small quantities of binders. In individual cases, the proportion of binder to waste material is laid down under technical and economic standpoints. Generally, there are approximately at least three parts by weight of binder for 100 parts by weight of coarse dry waste material. In order to permit an economic solution to the problem, the maximum binder quantity is approximately 35 parts by weight for every 100 parts by weight of dry waste material.

The binders usable according to alternative (a) are plastics or bituminous substances which are hard or even brittle at normal temperatures, which soften in a reversible manner when heat is supplied and are converted into a viscous liquid at higher temperatures.

Bituminous materials are understood to mean those which contain a percentage of bitumen, tar and/or pitch. The term also covers asphalts, i.e. mixtures of bitumen and mineral substances. Such a bituminous material contains for example 82% carbon, 10% hydrogen, 6% sulphur and 1% nitrogen. Thus, for performing the process of the invention, e.g. an asphalt matrix is filled with 60 to 70% of anhydrous special waste with a particle size below 100 u. The mixture is prepared by heating the asphalt to approximately 150° to 180° C. and stirring in the special waste.

It is also possible to use organic binders for performing the process of the invention which, in the presence of a hardening agent, i.e. a cross-linking agent, bring about the hardening of the mixture. Examples of such binders are the preliminary stages of cured polyurethanes, epoxides and polyester resins, e.g. in the form of so-called casting resins.

After solidification or hardening, when using the above-mentioned organic binders, a closed, water-repelling surface is obtained, thereby preventing an elution of the waste and/or emission therefrom.

The binders usable according to alternative (b) are in particular lime in the form of calcium hydroxide, gypsum which hardens when water is added, and in particular waste gypsum, as well as cement and cement-like products.

When calcium hydroxide and gypsum are used as binders, in most practical applications approximately 6 to 35 parts by weight thereof are used for every 100 parts by weight of waste (dry substance). The preferred range is approximately 8 to 20 parts by weight of binder for every 100 parts by weight of waste. However, the optimum range is dependent on the particular application.

When cement or cement-like products are used as binders, approximately 3 or more parts by weight thereof are used per 100 parts by weight of waste (dry substance). The preferred range is 5 to 25 parts by weight. Particular preference is given to the range 8 to 15 parts by weight.

When performing the process of the invention, it is preferable to use cement or cement-like products as the binders, added together with the necessary quantity of setting water. Thus, they are finely ground, hydraulic binders, e.g. hardening in rock-like manner on absorbing water and waterproof after hardening. It is possible to use all types of cement which, for forming a concrete-like product, bring about the necessary strength and resistance to elution and emission. Preferred examples of cement binders are Portland cement, particularly in the form of so-called "waste-cement", but it is also possible to use blast furnace cement. It is also possible to use high alumina cements which, unlike the so-called standard cements, mainly comprise calcium aluminates instead of calcium silicates. The term cement is to be understood in its broadest sense. It is also intended to cover those binders which are not standardised as cements, such as suevite trass cement, high alumina cement, deep well cement, fly ash cement, regulated set cement, swelling cement and sulphate blast furnace cement i.e. materials whose characteristics are similar to those of cement.

For the purpose of the invention, preference is given to blast furnace cements which have a greater resistance to chemicals than Portland cement. The quantity of cement to be used in a particular case is dependent on the nature of the cement, the type of waste to be disposed of, the desired hardness of the end product, the nature of the setting water, the hardening conditions and the like. It has surprisingly been found that even when relatively small quantities of cement are added, i.e. approximately 3 parts by weight per 100 parts by weight of waste, products are often obtained which display good resistance to elution and emission.

When cement and cement-like products are used as binders, the setting water is the "hardening agent". The setting water used is preferably contaminated ground water or aqueous waste materials from chemical conversion and synthetic processes. This also has the advantage that at the same time these undesired aqueous fluids are permanently removed. The quantity of water employed in each instance is dependent on the nature of the cement, the characteristics of the waste, the hardening conditions, etc.

In certain applications for the process of the invention, it can be advantageous to add adjuvants to the mixture of the waste material and the binder; these serve to improve the physical properties of the hardened product or aid the performance of the process. Examples of these are water-repelling agents, solvents and sealing agents.

Examples of water-repelling agents are higher fatty acids, such as stearic and palmitic acid, alkyl sulphates, alkyl aryl sulphonates, alkyl sulphonates, sulphosuccinates, salts of carboxylic acids, soaps, sulphosuccinamides, ether sulphates, nonyl phenol polyglycolethers, fatty alcohol polyglycolethers and their sulphating products, certain silicates such as water glass, paraffins and the like.

Solvents and sealing agents are of particular interest in conjunction with the use of cement and cement-like products. Examples of such solvents, which are also known as "concrete liquefiers" are surfactants such as lysine sulphonate, melamine resin materials and sulphonated naphthalenes. Suitable sealing agents contain pore-forming agents (fatty acid compounds such as stearates and oleates, swellable substances in the form of albumin decomposition products, as well as water-repelling agents.

When using cement as the binder, it may also be advantageous to add antifreezing agents, if it is necessary or planned to perform the process of the invention at temperatures below 0° C. Suitable antifreezing agents are water-soluble organic liquids such as glycols, e.g. ethylene glycol and polyethylene glycol, various salts, such as magnesium chloride, sodium chloride and the like.

The process of the invention is particularly suitable for special waste having mainly a mineral origin and from which it is possible to elute by rainwater heavy metals and even those of a toxic nature. These heavy metals can be e.g. mercury, copper, tin, lead, nickel, cobalt, cadmium, iron, zinc, manganese, magnesium, calcium, strontium, etc.

Hereinafter, examples are given of waste materials with mineral constituents which can be removed with particular advantage by the process of the invention. The aqueous fluids referred to can be used as the setting water or taken into consideration when calculating the quantity of setting water required. After each specific waste material, its source is given:

| | |
|---|---|
| Blast furnace and foundry waste | Metal production foundries |
| SiO$_2$ crucible fragments | Metal production foundries |
| Furnace clearing for metallurgical processes | Metal production, foundries, metal processing |
| Furnace clearing for non-metallurgical processes | Processing of rocks and soils, production of ceramic products, production and processing of glass |
| Clearing of boiler systems | Boilers |
| Dolomite | Metal production furnaces |
| Chrome-magnesite | Metal production furnaces |
| Furnace clearing from metallurgical processes with production-specific impurities | Metal production foundries, metal processing |
| Furnace clearing from non-metallurgical processes with production-specific impurities | Production of ceramic products, production and processing of glass |
| Cupola furnace slag | Iron and malleable iron foundries |
| Slag from non-ferrous metal charges | Non-ferrous metal production and foundries. |
| Lead waste | Lead foundries, printing plants |
| Aluminum-containing light metal waste | Aluminum production, foundries and smelters |
| Melting electrolysis slag | Light metal production |
| Sintered ferric oxide | Iron and steel production |
| Iron silicate slags | Iron and steel production, iron, steel and malleable iron foundries |
| Zinc slag | Zinc production and foundries |
| Aluminum-containing salt slag | Aluminum smelters |
| Tin ash | Tin production |

| | |
|---|---|
| Lead ash | Lead production |
| Blast furnace gas dust | Iron and steel production particularly electric steel production, iron steel and malleable iron foundries |
| Ferrous metal-containing filter dust | Iron and steel production, iron, steel and malleable iron foundries |
| Non-ferrous metal-containing filter dust | Non-ferrous metal production and foundries |
| Electric furnace slag | Metal production |
| Blast furnace slag | Iron steel production |
| Converter slag | Iron and steel production |
| Fly ash and flue dust | Furnaces |
| Fly ash coke | Pulverised coal firing plants |
| Glowing smoking ash | Smokeries |
| Lignite ash | Lignite firing plants |
| Wood ash | Wood firing plants |
| Boiler slag | Furnaces |
| Slag and ash from refuse incinerators | Refuse incinerators and sulphite liquor burning |
| Fly ash and dust from refuse incinerators | Refuse incinerators and sulphate liquor burning |
| Slag and ash from special waste incinerators | Special waste incinerators |
| Fly ash and dust from special incinerators | Special waste incinerators |
| Used foundry sand | Iron, steel and malleable iron foundries |
| Filling and blasting sand | Iron and steel and malleable iron foundries |
| Limestone sand | Chemical industry soda manufacture |
| Ceramic waste | Production of ceramic products |
| Glass waste | Production and processing of glass, bottling plants |
| Asbestos cement waste and dust | Processing and production of asbestos cement |
| Waste washings | Mining, preparation of coal and ore |
| Chamotte | Chamotte production and processing |
| Activated carbon waste | Chemical industry |
| Activated carbon manufacture | Chemical industry |
| Rock and polishing dust | Processing of natural and synthetic rocks, rock dressing processes |
| Fine dust from slag preparation | Slag preparation |
| Coal dust | Coal crushing and pulverised coal firing |
| Roasted pyrites | Chemical industry, sulphuric acid manufacture |
| Moulding sand | Foundries |
| Core sand | Foundries |
| Spent oil binders | Oil accidents |
| Graphite waste, dust and sludge | Metal production, chemical industry, arcing processes |
| Glass and ceramic waste with production-specific impurities | Production of ceramic products, production and processing of glass, glass dressing, electrical engineering, production of fluorescent tubes, lamps, picture tubes and chemical industry |
| Spent filter and absorption masses, such as kieselguhr, active earths and activated carbon | Chemical industry, chemical cleaning, absorptive gas and liquid cleaning |
| Asbestos waste and dust | Preparation and processing of asbestos |
| Gypsum waste | Production of gypsum products, flue gas desulphurization |
| Mineral muds such as red mud | Aluminum production, alumina processing |
| Enamel sludge and slip | Enamelling |
| Graphite sludge | Production and processing of graphite |
| Iron works sludge | Iron and steel production |
| Steel work sludge | Hot rolling mills |
| Foundry sludge | Foundries |
| Glazing sludge | Glass decoration and glazing |
| Gypsum sludge with product-specific impurities | Chemical industry, neutralization, flue gas desulphurization |
| Slakes lime with product-specific impurities | Chemical industry, neutralization |
| Magnesium oxide sludge | Magnesium processing |
| Ferric oxide sludge from reduction processes | Chemical industry |
| Non-ferrous metallurgy sludge | Non-ferrous metal production, foundries, remelting plants |
| Alumina sludge | Aluminium production and remelting plants |
| Nitrate, nitrite and cyanide-containing hardening shop sludge | Hardening shops |
| Barium carbonate sludge | Hardening shops |
| Barium sulphate sludge | Chemical industry, paper and cardboard production |
| Mercury-containing barium sulphate sludge | Chemical industry, chlorine manufacture |
| Glazing sludge with product-specific impurities | Glass decoration and glazing |
| Contaminated well sinking sludge | Well sinking operation |
| Phosphate treatment sludge, surface finishing | Phosphate treatment |
| Calcium sulphite sludge | Flue gas desulphurization |
| Metal waste such as iron-containing dust | Iron and steel production, iron, steel and malleable iron foundries |
| Iron and steel processing | Grinding mills |
| Lead containing dust | Lead production and foundries, printing works electrical engineering, production of accumulators and cables, lead processing |
| Aluminum-containing dust | Aluminum production, foundries, remelting works, processing |
| Beryllium-containing dust | Beryllium processing, production of navigational instruments |
| Magnesium-containing dust | Magnesium production, foundries, remelting works, processing |
| Zinc-containing dust | Zinc production, foundries, hot galvanizing |
| Non-ferrous metal containing dust | Non-ferrous metal production, foundries, remelting works, processing |
| Metal sludge, such as zinc sludge | Galvanizing plants, printing works, production of blocks |
| Metal grinding sludge | Metal processing |
| Lead sludge | Lead production and processing electrolytic processes |
| Tin sludge | Tin production, soldering plants, radiator manufacture |
| Trowel sludge | Surface processing |
| Jarosite sludge | Non-ferrous metal production |
| Gas cleaning masses | Coke ovens, gas works |
| Fire extinguisher powder residues | Production and use of fire extinguishers |
| Skorodite sludge | Non-ferrous metal production |
| Galvanic sludge, such as chromium (VI), chromium (III) copper, zinc, cadmium, nickel, cobalt and/or precious metal containing galvanic sludge | Galvanizing and partial galvanizing plaints, e.g. for machine and vehicle building, electrical engineering, precision mechanics and optics, manufacture of clocks, iron, sheet metal and metal goods |
| Oxides and hydroxides such as zinc oxide | Zinc production, foundries, hot galvanizing |

| | -continued |
|---|---|
| Zinc hydroxide | Galvanizing plants, printing works, production of blocks, chemical industry |
| Pyrolusite, manganese dioxide | Production of batteries, chemical industry |
| Alumina | Aluminium production, remelting works, chemical industry |
| Ferric hydroxide | Surface treatment of iron and steel, pickling and etching plants |
| Salts, such as arsenolite | Non-ferrous metal production |
| Boiler scale | Removing mud and cleaning boilers |
| Metal salt-containing washing and rinsing waters | Surface treatment and processing |
| Mineral oil sludge such as honing and lapping sludge | Metal surface processing |
| Oil-containing grinding sludge | Metal processing |
| Shredder residues and filter dust from shredders | Scrap processing, shredder plants |
| Flue dust from working with hard lead | Lead melting |
| Liquid waste from housing estates such as ground water from refuse and special waste dumps and oil-containing soils | |

The above special waste materials are used alone or mixed with one another or with other special waste materials. Waste materials with a particle size of up to 50 mm can be used without further crushing, whereas coarser waste material must be crushed to a particle size below 50 mm using suitable crushing machines. The range of 2 to 50 mm is generally suitable. Preference is given to the range of 0.01 to 10 mm and more specifically to the range 0.1 to 2 mm. In the latter case, the material is ready in a pulverulent form.

The mixing plants for producing the mixture of the binder and waste material, with the optional addition of hardening agents and further adjuvants can be constituted by continuously operating equipment, such as screw mixers and double-shaft mixers, as well as discontinuously operating equipment such as concrete mixers. Obviously, the fluid or pourable mixture of the aforementioned starting substances can be supplied to the dump by means of corresponding pipelines. The transporting time is naturally dependent on the hardening or solidification time.

The process of the invention is explained in greater detail hereinafter relative to the disposal of waste materials having mainly a mineral origin and using blast furnace cement as a binder. However, these statements obviously apply appropriately to other waste materials and binders, particularly the above-mentioned type.

Firstly, a preliminary mixture is prepared of the blast furnace cement and the fine-grained waste. Subsequently, water is added, preferably in the form of contaminated ground water, in quantities of preferably 200 to 400 parts by weight and in particular 250 to 350 parts by weight per 100 parts by weight of the blast furnace cement. A mixing time of 15 minutes has proved particularly suitable. The mixture obtained can then be fed directly into a dumping area where it immediately solidifies and hardens. However, it can also be supplied to a dumping area which already contains plastic or metal drums, which frequently have a capacity of 200 liters and which already contains special waste. For the concreting in of such drums, they are regularly arranged in a contiguous manner in a prepared area of approximate dimensions 10×30 m. The area is provided with plank partitions in such a way that the form work is approximately 25 cm higher than the drums. The prepared mixture in pourable and in fluid form and can be considered a type of "waste concrete" which is brought into a concrete-liquid consistency by means of a concrete transporter and concrete pump and is then pumped into the prepared area. The waste concrete introduced is distributed and compressed by means of vibrating apparatus. The in situ vibration and compression can be eliminated if a concrete liquefier is added. By means of the latter, the mixture can be set in such a way that the prepared dump which is filled with drums can be filled up in a completely tight and homogeneous manner without additional mechanical aids being necessary. The concrete liquefier is used in a quantity of 0.5 to 3% by weight, based on the blast furnace cement weight.

Due the the fact that the content of the drums no longer comes into contact with rainwater, the formation of ground water with a high salt and heavy metal content is prevented. Therefore, the ground water from such a dump can generally be fed into conventional purification systems. Concreting in prevents any emission of gaseous and pulverulent constituents. Examples of gaseous emission products are mercaptans, acrolein, acrylic acid, ethyl esters, ethyl amines, ethylene diamine, arsenic hydride, ammonia, pyridine, hydrogen sulphide, sulphur dioxide, etc. Examples of particularly undesired pulverulent emission products are lead dust, zinc dust, titanium dioxide dust and asbestos dust.

The process of the invention has the following advantages. It is possible to store drums filled with special waste which have a limited compressive strength. It is possible to dispose of waste, which could not hitherto be dumped due to its low compressive strength. The process also permits toxic special wastes to be stored in drums, because contact with the environment is no longer possible. It is also possible to store special waste which reacts with water, because rainwater no longer has access to the waste materials.

When using the process of the invention, it is no longer necessary to remove contaminated ground water, thereby avoiding the substantial costs involved in such operations.

The products stored in accordance with the invention have a particularly high physical strength and increased resistance to elution and emission, as will be explained hereinafter relative to the examples. Due to the high degree of strength of the products obtainable according to the invention, it is possible to bring about an optimum utilization of the space available in special waste dumps, because there is no need for intermediate coverings with clay or soil and the process products can also be stacked above ground level. Furthermore, the spaces between metal or plastic drums in the dumping areas which contain special waste can be filled with the mixture according to the invention. This leads to an additional stabilisation of the drums. Corrosion of the metal drums or the emptying of already corroded drums is prevented.

As previously stated, a particular advantage of the inventive process is the gain in volume. An additional utilized volume of approximately 30% is obtained by filling the spaces between waste material drums in dumps. An additional saving as regards volume and cost is obtained through eliminating intermediate coverings of clay or soil with a height of 50 cm. The hitherto necessary partitions for separating acid, alkaline and neutral constituents from one another are rendered superfluous. This means a further volume saving of approximately 10%.

Whereas hitherto special waste could only be stored up to ground surface level or 2 to 4 m below this level, the inventive process makes it possible for the waste to extend to a height of 10 to 15 m above surface level. This leads to a further volume saving of approximately 40%.

Regarding the saving in volume, it can be stated that the process of the invention leads to a 100% utilization of the volume available in the dumping area for storing waste materials, whereas hitherto this figure has been only approximately 40%.

A particular advantage of the inventive process is that the starting mixture is initially poured into a mold, e.g., a cube-shaped mold with an edge length of 1 m, where it is allowed to solidify. Subsequently, the filled mold or the solidified content, after removal from the mold, can be deposited in a domestic refuse or special refuse dump. A cube shape is advantageous because this permits a space-saving stacking in dumps.

As the waste material prepared according to the process of the invention can no longer give off organic or inorganic noxious substances, it is also possible to store the product in ordinary refuse dumps.

Hereinafter, preferred embodiments of the process of the invention are described in which cement or cement-like binders are used. Thus, it has been found that when only pulverised special waste of a particle size < 1 mm is present, the strength properties of the process product are sometimes improved if additional strength-aiding aggregates such as gravel, blast furnace slags and/or a crumbled "pre-concreted" process products of a coarser particle size are added to the starting mixture.

It has proved advantageous to use approximately 10 to 50 parts by weight, preferably 20 to 40 parts by weight of gravel with a particle size of approximately 0.5 to 5 cm or 10 to 50 parts by weight, preferably 20 to 40 parts by weight of blast furnace slag with a particle size of approximately 0.05 to 5 cm per 100 parts by weight of waste material or special waste (dry substance).

In order to improve the strength characteristics of the process product, it is, for example, possible to add a granular aggregate with a particle size of approximately 0.1 to 5 cm, it being possible to produce such an aggregate, e.g., in step (a) by mixing 100 parts by weight of a pulverised special waste from an electrostatic filter dust with a particle size of less than 0.1 mm with 3 to 30 parts by weight and preferably 4 to 6 parts by weight of cement and 30 parts by weight of water. In step (b), the mixture obtained by step (a) is permitted to soldify. After a reaction time of 8 to 10 days, the dried mixture is comminuted by means of a mill, for example a hammer mill. In step (c) the screen fraction of approximately 0.1 to 5 cm is used as an aggregate in repeating step (a) to form "special concrete" from pulverulent special waste. However, cases are also conceivable in which said aggregate is mixed solely with cement and water and optionally further additives and then processed according to the invention. Step (d) involves depositing the mixture obtained by step (c) in a pourable state into holding means and causing it to finish-harden therein, as described elsewhere herein.

In some cases, it can be advantageous to use suitable adjuvants for improving the water retaining capacity of the special concrete or for preventing its drying out during setting. Thus, for example, when using pulverised or other fine-grained special waste with a particule size smaller than 0.1 mm, drying out can occur, i.e the special concrete dries too rapidly, cracks or crumbles. In such an exceptional case, the special concrete strength must be improved. Adjuvants which prevent the aforementioned undesired phenomena are for example water-soluble cellulose ethers, such as methyl cellulose, ethyl cellulose, hydroxy propyl cellulose, hydroxy ethyl cellulose and mixtures of said cellulose derivatives. When performing the process according to the invention, they can be added to the starting mixture in a quantity of approximately 1 to 5% by weight in the form of a 1 to 2% solution. Thus, 1 to 5 parts by weight of this solution are used, for example, in a mixture of 100 parts by weight of waste material, 10 parts by weight of cement and 20 parts by weight of water.

In certain cases, it can be advantageous to use other adjuvants which improve the bending strength and permeability, together with the chemical resistance of the finished product. These adjuvants include water-dispersed polyacrylates with a corresponding resistance to alkalis.

Although the aforementioned preferred embodiments of the invention were described in conjunction with special wastes, the statements made obviously apply in general terms to random waste materials.

The invention is further illustrated hereinafter by means of examples.

EXAMPLE 1

The special waste used was electrostatic precipitator dust from an electric steel production plant. The dust had the following composition: approximately 48% ferric oxide, 20% calcium oxide, 10% manganese oxide, 10% zinc oxide, 5% magnesium oxide, 5% alumina and 3% lead oxide. The solid content was therefore approximately 100%. The particle size was below 100 u and the density approximately 800 to 900 kg/m$^3$.

100 kg of the above electrostatic precipitator dust were mixed dry with 5 kg of blast furnace cement and 60 kg of water until a pouring or casting consistency was obtained. The mixture was cast in cube-shaped moulds of edge length 25 cm and dried at ambient temperature for 28 days. The test cubes had the following data:

| Days | 1 | 4 | 7 | 14 | 28 |
| --- | --- | --- | --- | --- | --- |
| Needle penetration in mm | 0.4 | 0.3 | 0.25 | 0.23 | 0.1 |
| 100 g weight | | | | | |
| Conical needle tip dia. 0.15 mm | | | | | |
| Penetration time 5.0 sec. | | | | | |
| Compressive strength | 75 kg/cm$^2$ | | | | |
| Permeability coefficient | 1.8 × 10$^{-7}$cm/sec | | | | |

In accordance with the above procedure, a test cube with an edge length of 2 cm was then produced and was investigated in accordance with the standard German process for the investigation of sewage and sludge, subgroup S4 in connection with the elution of constituents relevant to the environment, i.e. in this case zinc oxide and lead oxide. It was found that only 1.6 mg/l of lead and 0.26 mg/l of zinc were eluted. These values are well below these fixed as maximum values by the strict environmental protection laws.

EXAMPLE 2

The special waste used was constituted by copper slag-sand blasting residues from a sand blasting plant and formed by 99.6% sand (silica) approximately 0.4% copper oxide and traces of zinc oxide, ferric oxide, manganese oxide and chromium oxide. The original particle size of the waste material was approximately 1 mm (fine sand) with a solid content of approximately 100% and a density of approximately 1,200 to 1,300 kg/m$^3$.

100 kg of the sand blasting residue, 10 kg of cement and 17 kg of water were processed as described in the mixing process of example 1 and cast to give test cubes with the following physical data:

| Day | 1 | 4 | 7 | 14 | 28 |
|---|---|---|---|---|---|
| Needle penetration (mm) | 5 | 3 | 2 | 1.5 | 0.1 |
| Compressive strength: 100 kg/cm$^2$ and permeability coefficient 2.3 × 10$^{-8}$ cm/sec (after 28 days) | | | | | |

In accordance with the procedure of example 1, a test cube with an edge length of 2 cm were investigated and it was found that of the constituents relevant to the environment only 0.05 mg/l of chromium were eluted.

EXAMPLE 3

The special waste was constituted by pulversied glass residues and imperfect changes from glass production processes and had a composition of approximately 35% sulphate, approximately 21% lead oxide, approximately 4% silicon, approximately 20% fluoride and approximately 20% of adhering moisture (water). The constituent whih was prejudicial to the environment was lead oxide. The special waste was pulverulent, had a solids content of approximately 80% and a density of approximately 2,800 kg/m$^3$.

100 kg of the above special waste was mixed in accordance with example 1 with 10 kg of cement and 10 kg of water and a test cube was produced for determining the physical characteristics, which were:

| Day | 1 | 4 | 7 | 14 | 28 |
|---|---|---|---|---|---|
| Needle penetration (mm) | 3 | 1 | 0.1 | <0.1 | <0.1 |
| Compressive strength | | | 150 kg/cm$^2$ | | |
| Permeability coeffcient | | | 6.7 × 10$^{-6}$ cm/sec. | | |

An eulution test according to example 1 was performed and it was found that only 1.7 mg/l of lead were eluted.

EXAMPLE 4

The special waste was constituted of galvanic filter cake in the form of a chamber filter press resudue from a water treatment and galvanic detoxicating plant containing 50% of nickel hydroxide, 20% ferric hydroxide, 20% cadmium hydroxide and 10% chromium hydroxide, copper hydroxide and zinc hydroxide. On the basis of the composition, cadmium and zinc hydroxide were considered as the constituents prejudicial to the environment. The particle size of the original waste was considered to be "fragmentary". The solids content was approximately 60% and the density approximately 1700 kg/cm$^3$. In accordance with the standard sewage and sludge investigation process referred to in example 1 (subgroup S4) 100 g of waste were added to 100 ml of distilled water, underwent overhead shaking for 24 hours and was filtered. The following eluate values were obtained: 47.0 mg/l of cadmium and 145 mg/l of zinc.

100 kg of the aforementioned starting material was mixed with 10 kg of blast furnace cement and 20 kg of water according to the process of example 1. According to this process, they physical and chemical data of cast test cubes were determined:

| Day | 1 | 4 | 7 | 14 | 28 |
|---|---|---|---|---|---|
| Physical data of the test cube | | | | | |
| Needle penetration (mm) | 5 | 3 | 2 | 1 | 0.1 |
| Compressive strength | | 60 kg/cm$^2$ | | | |
| Permeability coefficient | | 4.3 × 10$^{-6}$ cm/sec | | | |
| Chemical data of the test cube | | | | | |
| (Elution values): | | | | | |
| Cadmium | <0.01 mg/l | | | | |
| Zinc | 0.07 mg/l | | | | |

EXAMPLE 5

The special waste was in the form of zinc hydroxide residues from the neutralization process of a printing block works. The residues had a composition of approximately 40 to 60% zinc hydroxide and zinc oxide, whilst adhering moisture (water) represented approximately 40 to 60%. Zinc oxide and zinc hydroxide were the constituents considered prejudicial to the environment. The particle size was "fragmentary", the solids content approximately 60% by weight and the density approximately 1200 kg/m$^3$. An elution test in accordance with the above-described procedure was performed and an elution value of 2.61 mg/l of zinc was found.

The zinc hydroxide residues were firstly crushed and were then processed in accordance with example 1 and in all 100 kg of zinc hydroxide residues were mixed with 10 kg of blast furnace cement and 30 kg of water. The test cube had the following physical data:

| Day | 1 | 4 | 7 | 14 | 28 |
|---|---|---|---|---|---|
| Needle penetration (mm) | >50 | 30 | 25 | 22 | 10 |
| Compressive strength | | 50 kg/cm$^2$ | | | |
| Permeability coefficient | | 0 cm/sec | | | |

The chemical elution date of the test cube were 0.36 mg/l of zinc.

EXAMPLE 6

The special waste was formed by the electrostatic precipitator dust of a domestic refuse incinerator constituted by 70% SiO$_2$, approximately 4% heavy metal oxides and approximately 26% alkaline earth oxides. Lead, zinc and cadmium were the constituents prejudicial to the environment. The particle size was below 40μ, the solids contents approximately 80% and the density approximately 900 kg/m$^3$.

100 kg of the flue dust were mixed with 10 kg of blast furnace cement and 33 kg of water, in accordance with the process of example 1 and test cubes were cast for determining the corresponding physical and chemical data, which are given below:

| Day | 1 | 4 | 7 | 14 | 28 |
|---|---|---|---|---|---|
| Physical data of the test cube | | | | | |
| Needle penetration (mm) | 2 | 1 | 0.9 | 0.8 | 0.5 |
| Compressive strength | | | 100 kg/cm$^2$ | | |
| Permeability coefficient | | | 0 cm/sec | | |
| Chemical elution values of the test cube | | | | | |
| 0.1 mg/l lead | | | | | |
| <0.01 mg/l zinc | | | | | |
| <0.01 mg/l cadmium | | | | | |

EXAMPLE 7

The special waste was constituted by lead-containing batch residues in the form of contaminated raw materials from a glass works and having the following composition: 30% lead oxide and lead dioxide, 15% sodium carbonate, 10% potassium carbonate, 5% adhereing moisture (water) and 40% quartz sand. Lead oxide was the constituent prejudicial to the environment. The batch residue was pulverulent and contained broken glass. The solids content was approximately 100% and the density approximately 900 kg/m$^3$.

The original waste was investigated in accordance with the elution process described in Example 4 and an elution value of <3.5 mg/l of lead was obtained.

100 kg of the lead-containing batch residue, 10 kg of blast furnace cement and 20 kg of water were processed in accordance with the mixing process of example 1 and cast to give the corresponding test cubes. The characteristics obtained were as follows:

| Day | 1 | 4 | 7 | 14 | 28 |
|---|---|---|---|---|---|
| Physical data of the test cube | | | | | |
| Needle penetration (mm) | 2 | 1 | 0.6 | 0.4 | 0.2 |
| Compressive strength | | | 120 kg/cm$^2$ | | |
| Permeability coefficient | | | 1.2 × 10$^{-8}$ cm/sec | | |
| Chemical elution value of test cube | | | | | |
| 0.11 mg/l of lead | | | | | |

EXAMPLE 8

The special waste was constituted by flue dust from hard lead working in non-ferrous metal production. Its composition was approximately 25% lead oxide, approximately 25% antimony oxide, approximately 25% arsenic oxide, approximately 10% zinc oxide, approximately 10% elementary carbon and approximately 5% chlorides and sulphates. The constituents relevant for the environment were lead, zinc, cadmium, antimony and arsenic. The particle size of the waste material was less than 40μ, its solids content approximately 100% and its density approximately 900 to 1200 kg/m$^3$.

In accordance with the procedure described in example 4, the following elution values were obtained: 68.5 mg/l of lead, 5.4 mg/l of cadmium and 61.0 mg/l of zinc.

100 kg of the flue dust, 10 kg of blast furnace cement and 10 kg of water were mixed in accordance with the procedure of example 1 and cast into test cubes. The following physical and chemical data were obtained from the test cubes:

| Day | 1 | 4 | 7 | 14 | 28 |
|---|---|---|---|---|---|
| Physical data of the test cube | | | | | |
| Needle penetration (mm) | 2 | 1 | 0.8 | 0.4 | <0.2 |
| Compressive strength | | | | | 150 kg/cm$^2$ |
| Permeability coefficient | | | | | 0 cm/sec |
| Chemical elution values of the test cube | | | | | |
| <0.05 mg/l lead | | | | | |
| 0.16 mg/l zinc | | | | | |
| <0.01 mg/l cadmium | | | | | |

EXAMPLE 9

The waste material was in the form of oil-containing soil from an oil accident. It consisted of 40% top soil, 50% sand and 10% fuel oil. The solids content was approximately 42% and the density approximately 1200 kg/m$^3$.

In accordance with the process of example 4 an elution value of 220 mg/l of petroleum ether extract was obtained for the original waste material.

According to the mixing process of example 1, 100 kg of oil-containing soil, 10 kg of blast furnace cement and 10 kg of water were mixed and cast into test cubes, which were used for obtaining the following physical and chemical data:

| Day | 1 | 4 | 7 | 14 | 28 |
|---|---|---|---|---|---|
| Physical data of the test cube | | | | | |
| Needle penetration (mm) | 10 | 5 | 4 | 3 | 2 |
| Compressive strength | | | 50 kg/cm$^2$ | | |
| Permeability coefficient | | | 0 cm/sec | | |
| Chemical elution value of test cube | | | | | |
| <20 mg/l petroleum ether extract. | | | | | |

EXAMPLE 10

The special waste was formed by bypass electrostatic precipitator dust from a special refuse incinerator. This dust contained non-ferrous metals, iron, lead, zinc, aluminum and sand blasting residues. The binder was asphalt, i.e. a mixture of bitumen, powdered quartz, quartz sand, chalk, barium sulphate and sand. The starting mixture had a particle size of 0 to 2 mm.

25 parts by weight of the above electrostatic precipitator dust with a particle size of 0 to 0.1 mm (from metal production) and 55 parts by weight of a blast furnace slag of particle size 0.1 to 2 mm were mixed with 20 parts by weight of bitumen B65 in order to obtain an asphalt mixture. The bitumen binder B65 was placed in a heated stirrer vessel and slowly heated to approximately 150° C. The fillers were gradually added accompanied by stirring ensuring that the temperature did not drop below 120° C. The heated finished mixture was introduced into the cavities of drums with a volume of 200 liters and was overfilled, i.e. 20 cm higher than the edge of the drum. The compressive strength of the cooled, solidified mixture was the same as that of a road surface. The permeability coefficient is substantially zero.

EXAMPLE 11

The starting materials for producing the mixture were constituted by 20% by weight electrostatic precipitator dust from a domestic refuse incinerator and flue gas washer, 20 parts by weight of bypass dust, 45 parts by weight of lead-containing electrostatic precipitator dust and 15 parts by weight of bitumen B65. Processing was in accordance with the procedure described in example 10. The characteristics of the process product were substantially identical with those of the product of example 10. The aforementioned bypass dust was obtained during the filtration of waste gases in cement production. It consisted mainly of calcium oxide with small amounts of alkali sulphate and alkali chloride.

EXAMPLE 12

65 parts by weight of a galvanic filter cake (70% dry substance) were mixed with 35 parts by weight of blast furnace slag with a particle size of 0.5 to 5 cm. 12 parts by weight of blast furnace slag cement were then added. Homogenization was carried out for 5 minutes in a compulsory mixer, followed by the addition of 30 parts by weight of contaminated mixer. Mixing was continued for 5 minutes. After a setting time of 14 days the strength of 168 kg/cm$^2$ was obtained. The concrete block had excellent strength characteristics.

EXAMPLE 13

100 parts by weight of a galvanic filter cake were mixed with 10 parts by weight of cement in a compulsory mixer for 5 minutes. 30 parts by weight of water were added and mixing was continued for 5 minutes. 3 parts by weight of a 2% aqueous solution of hydroxy propyl cellulose were then added. The requisite strength of the process product was obtained.

EXAMPLE 14

100 parts by weight of chromic hydroxide filter cake, 14 parts by weight of cement, 30 parts by weight of contaminated ground water and 3 parts by weight of 50% aqueous dispersion of polyacrylate were mixed and allowed to harden. Before the following physical values were obtained after drying for 28 days:

| Needle penetration | 0.1 mm |
| --- | --- |
| Compressive strength | 164 kg/cm$^2$ |
| Permeability coefficient | 8.4 × 10$^{-11}$ cm/s. |

The process product obtained was characterized by excellent physical properties.

What is claimed is:

1. A method of depositing and ultimately disposing of special waste containing constituents which under environmental conditions can be eluted and emitted, comprising the steps of
   (a) mixing the special waste with setting water and with a binder selected from the group consisting of calcium hydroxide, gypsum hardening on addition of water, waste gypsum, cement and cement-like products,
   (b) permitting the mixture obtained by step (a) to solidify and thereafter granulating said solidified mixture to obtain an aggregate,
   (c) repeating step (a) using said aggregate as the binder to form a new mixture, and
   (d) depositing the mixture obtained by step (c) in a pourable state into holding means and causing it to finish-harden therein.

2. A method according to claim 1 wherein said holding means is a depositing chamber serving as the ultimate repository of said finish-hardened mixture.

3. A method according to claim 1 wherein said holding means is a mold, further comprising the step of removing said finish-hardened mixture from said mold and transporting it to an ultimate repository.

4. A method according to claim 1 wherein said pourable mixture is introduced into the voids of holding means already containing other special waste.

5. A method according to claim 4 wherein the holding means comprises barrels.

6. A method according to claim 1 comprising the step of mixing with the special waste conditioning means which improves the physical properties of the finish-hardened product.

7. A method according to claim 6 wherein said conditioning means affects at least one of the water-repellency, flow and sealing qualities of said mixture.

8. A method according to claim 1, 4, 5, 6 or 7 comprising the step of adding an antifreeze compound to the mixture at temperatures below 0° C.

9. A method according to claim 1, 4, 5, 6 or 7 comprising the step of adding solidity-improving means to said mixture selected from the group consisting of gravel and granulated blast furnace slag.

10. A method of depositing and ultimately disposing of special waste selected from the group consisting of blast furnace and foundry waste, SiO$_2$ crucible fragments, furnace clearing for metallurgical processes, furnace clearing for non-metallurgical processes, clearing of boiler systems, dolomite, chrome-magnesite, furnace clearing from metallurgical processes with production-specific impurities, furnace clearing from non-metallurgical processes with production-specific impurities, cupola furnace slag, slag from non-ferrous metal charges, lead waste, aluminum-containing light metal waste, melting electrolysis slag, sintered ferric oxide, iron silicate slags, zinc slag, aluminum-containing salt slag, tin ash, lead ash, blast furnace gas dust, ferrous metal-containing filter dust, non-ferrous metal-containing filter dust, electric furnace slag, blast furnace slag, converter slag, fly ash coke, glowing smoking ash, lignite ash, wood ash, boiler slag, slag and ash from refuse incinerators, slag and ash from special waste incinerators, used foundry sand, filling and blasting sand, limestone sand, ceramic waste, glass waste, asbestos cement waste and dust, waste washings, chamotte, activated carbon waste, activated carbon manufacture, rock and polishing dust, fine dust from slag preparation, coal dust, roasted pyrites, moulding sand, core sand, spent oil binders, graphite waste, dust and sludge, glass and ceramic waste with production-specific impurities, spent filter and absorption masses including kieselguhr, active earths and activated carbon, asbestos waste and dust, gypsum waste mineral muds such as red mud, enamel sludge and slip, graphite sludge, iron works sludge, steel work sludge, flundry sludge, glazing sludge, gypsum sludge with product-specific impurities, slakes lime with product-specific impurities, magnesium oxide sludge, ferric oxide sludge from reduction processes, non-ferrous metallurgy sludge, alumina sludge, nitrate, nitrite and cyanide-containing hardening shop sludge, barium carbonate sludge, barium sulphate sludge, mercury-containing barium sulphate sludge, glazing sludge with product-specific impurities, contaminated well sinking sludge, phosphate treatment sludge, surface finishing, calcium sulphite sludge, metal waste including iron-containing dust, iron and steel processing, lead containing dust, aluminum-containing dust, magnesium-containing dust, zinc-containing dust, non-ferrous metal containing dust, metal sludge including zinc sludge, metal grinding sludge, lead sludge, tin sludge, trowel sludge, jarosite sludge, gas cleaning masses, fire extinguisher power residues, skorodite sludge, galvanic sludg including chromium (VI), chromium (III) copper, zinc, cadmium, nickel, cobalt and precious metal containing galvanic sludge, oxides and hydroxides including zinc oxide, zinc hydroxide, lignite, manganese dioxide, alumina, ferric hydroxide, salts including arsenolite, boiler scale, metal salt-containing washing and rinsing waters, mineral oil sludge including honing and slapping sludge, oil-containing grinding sludge, shredder residues and filter dust from shredders, and liquid waste from housing estates including ground water from refuse and special waste dumps and oil-containing soils, said special waste containing constituents which under environmental conditions can be eluted and emitted, comprising the steps of mixing the special waste with contaminated setting water and a binder selected from the group consisting of hydrate of lime, gypsum hardening on addition of water, waste gypsum, cement and cement-like products, depositing the mixture thus obtained in a pourable state into holding means, and causing it to finish-harden therein.

11. A method according to claim 10 wherein said setting water comprises leakage water.

12. A method according to claim 10 wherein said setting water consists essentially of leakage water.

13. A method according to claim 10 wherein said setting water comprises waste of chemical conversion and synthesis processes.

14. A method according to claim 10 wherein said molding means is a depositing chamber serving as the ultimate repository of said finish-hardened mixture.

15. A method according to claim 10 wherein said holding means is a mold, further comprising the step of removing said finish-hardened mixture from said mold and transporting it to an ultimate repository.

16. A method according to claim 10 comprising the step of granulating said finish-hardened mixture and employing it as a solidity-improving means.

17. A method according to claim 1 or 10 characterized in that said special waste is mainly of mineral origin.

18. A method according to claim 17 wherein said special waste is selected from the group consisting of slags, dusts, sands and sludges.

19. A method according to claim 17 wherein said special waste is selected from the group consisting of cupola slag, silicate of iron slag, ferrous-mettaliferous filter dusts, non-ferrous-metalliferous filter dusts, electric furnace slags, blast furnace slags, conveter slags, boiler slags, slags and ashes from incinerating plants, slags and ashes from special waste incinerators, foundry old sand, blowing room sand and blasting sand, fine dust from slag processing, foundry sand, barium sulfate sludge, metal hydroxide sludge and electroplating sludge.

20. A method according to claim 1, 10, 16, 18 or 19 wherein said binder is selected from the group consisting of Portland cement and blast furnace slag cement.

21. A method according to claim 1, 16, 18 or 19 wherein said setting water is selected from the group consisting of contaminated leakage water and water-containing waste of chemical conversion and synthesis processes.

22. A method according to claim 1, 10, 16, 18 or 19 wherein said waste is reduced to a grain size of less than 50 mm.

* * * * *